Oct. 20, 1959  G. H. GOEHRIG, JR., ET AL  2,909,367
HYDRAULIC WEIGHING DEVICE
Filed Jan. 13, 1956  2 Sheets-Sheet 1
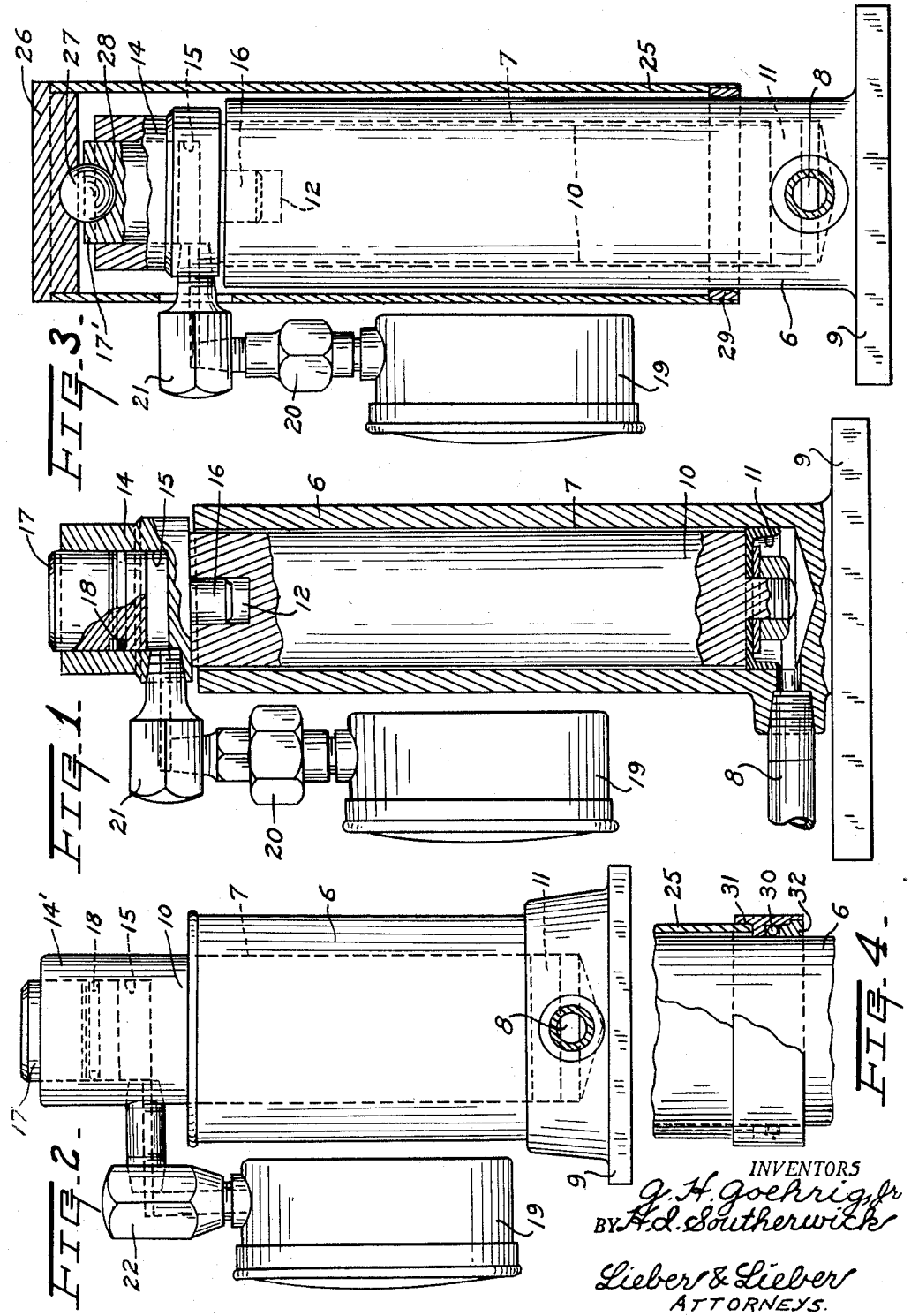
INVENTORS
G. H. Goehrig, Jr.
H. L. Southerwick
BY
Lieber & Lieber
ATTORNEYS.

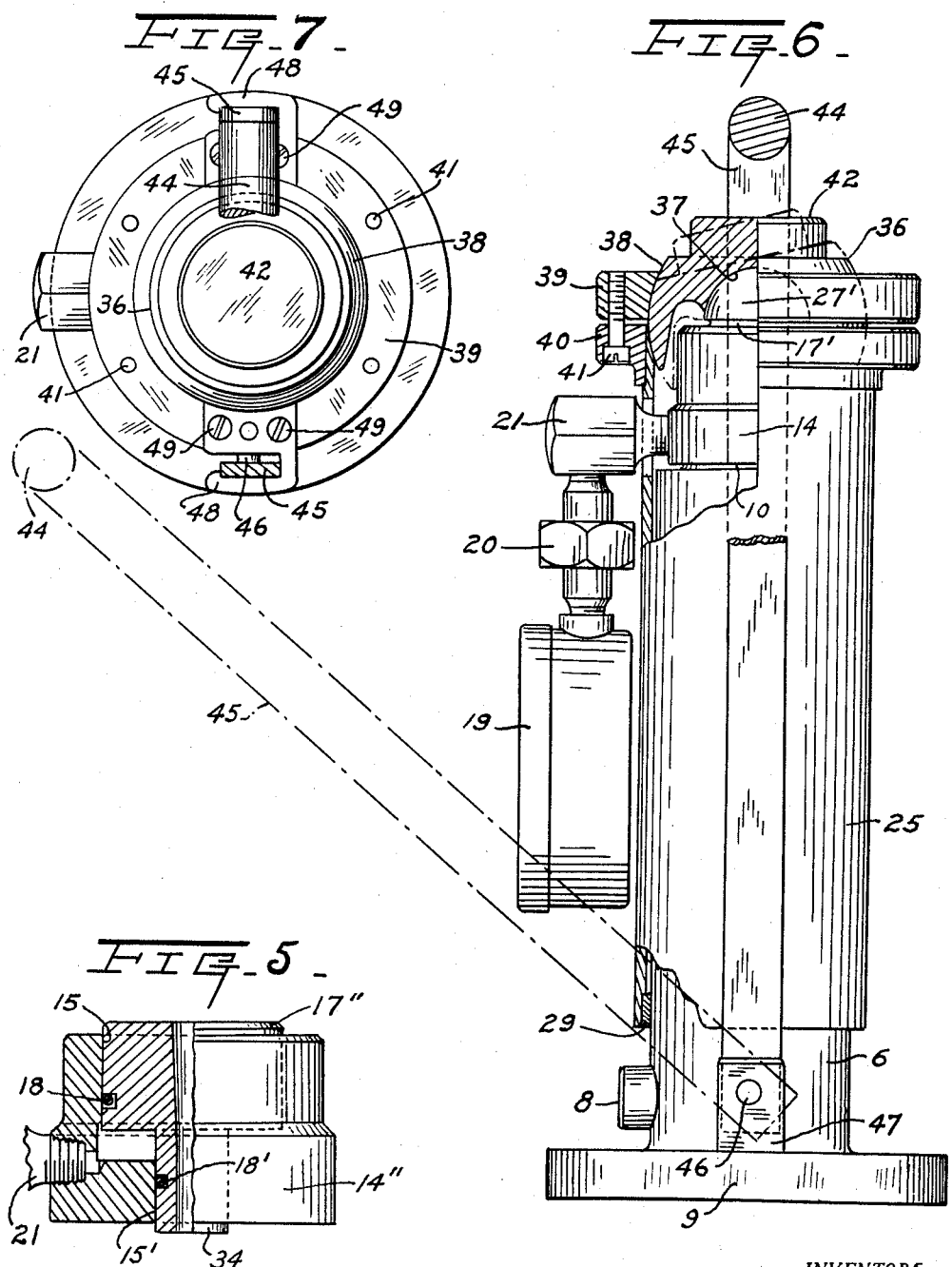

United States Patent Office 2,909,367
Patented Oct. 20, 1959

2,909,367

HYDRAULIC WEIGHING DEVICE

George H. Goehrig, Jr., Wauwatosa, and Harold I. Southerwick, Whitefish Bay, Wis., assignors to Blackhawk Mfg. Co., West Allis, Wis., a corporation of Wisconsin Application January 13, 1956, Serial No. 558,988

4 Claims. (Cl. 265—47)

The present invention relates generally to improvements in the art of ascertaining the weights of diverse types of loads, and relates more specifically to improvements in the construction and operation of devices for weighing mobile loads such as material laden vehicles or the like.

The primary object of the invention is to provide an improved fluid pressure actuated weighing device which is simple in construction and efficient in operation, and which is especially adapted to be readily associated with an ordinary load lifting assemblage such as a jack or an elevator.

It is frequently desirable to ascertain the weights of vehicles such as trucks, earth moving equipment, or the like, and their loads in order to compare capacities and to discourage violation of overloading regulations. While it has heretofore been proposed to utilize diverse types of mechanisms for such purposes, all of these prior devices have been too complicated, inaccurate, or otherwise objectionable.

It is therefore a more specific important object of our present invention to provide compact and portable means whereby any person may quickly and accurately ascertain the weight of vehicles and their loads at any locality.

Another important object of the invention is to provide an inexpensive but dependable weighing assemblage capable of being either built into or detachably associated with an ordinary vehicle lifting jack.

A further important object of the invention is to provide an improved vehicle load weighing device in which the accuracy of the readings are not undesirably affected by tilting of the lifting jack or by inclination of the surfaces with which the device cooperates.

Still another important object of the present invention is to provide a hydraulically actuated weight indicating device especially cooperable with the load lifting mechanism of a jack or other type of elevator, in a most effective manner.

An additional important object of this invention is to provide an extremely simple but accurate load weighing unit, which is safely operable and adapted to effectively cooperate with the loads at diverse angles.

These and other more specific objects and advantages of the invention will be apparent from the following detailed description from which it should be apparent that the gist of the improvement is the provision of a liquid confining chamber near the free end of the vertically movable load bearing member of an ordinary elevating device or jack, a load engaging element sealingly engaging the bounding wall of the chamber and coacting with the liquid within the latter, and a load weight indicating gauge communicating with the liquid confining chamber adjacent to the element.

A clear conception of the features constituting the present improvement and of several typical commercial embodiments of the invention, may be had by referring to the drawing accompanying and forming a part of this specification in which like reference characters designate the same or similar parts in the various views.

Fig. 1 is a central vertical section through a typical load lifting jack of the hydraulic type having an upright cylinder and a piston movable vertically therein, and having one of the improved hydraulic weighing devices detachably applied to the upper end of the load lifting member of the jack;

Fig. 2 is a side elevation of a similar jack, but having the hydraulic weighing device built directly into the upper end of the movable jack member;

Fig. 3 is a side elevation of a similar jack having one of the improved weighing devices detachably associated with the upper end of its load lifting member, but also having an improved appliance for preventing tilting of the jack from undesirably affecting the load weight registrations, applied to the weighing device and shown in section;

Fig. 4 is a fragmentary side elevation of a jack cylinder and a sectional view of a modified appliance adapted to function in a manner similar to that of Fig. 3;

Fig. 5 is a central vertical section through one of the improved weighing units also adapted for detachable association with the lifting member of a jack, but showing means other than those shown in Figs. 3 and 4 for preventing tilting of the jack from detrimentally affecting the load weight registrations;

Fig. 6 is a side elevation of another upright jack, showing a central section through an improved angle compensating assemblage associated with a weighing device applied to its lifting member, and also being provided with improved jack positioning means; and Fig. 7 is a top view of the mechanism shown in Fig. 6, with the weight indicating gauge omitted.

While the invention has been shown and described herein as being especially adapted to cooperate with the vertically reciprocable piston of a hydraulically actuated portable lifting jack, it is not the intent to restrict the use of the improved features to such load lifting devices; and it is also contemplated that specific descriptive terms employed herein be given the broadest possible interpretation consistent with the disclosure.

Referring to the drawings, each of the ordinary hydraulic lifting jacks shown therein by way of illustration, comprises an upright cylinder 6 having an upwardly open bore 7 and a liquid conduit or passage 8 communicating with the lower end of the bore 7 near the base plate 9; and a load lifting member or piston 10 slidable along the cylinder bore 7 and having an annular packing 11 at its lower end sealingly engaging the bore. The passage 8 is ordinarily connected to a source of liquid pressure supply such as a hand pump which may also be mounted on the base plate 9, to elevate the piston 10, and the piston displacement chamber is adapted to be alternately connected past a release valve with a liquid storage reservoir in order to permit the piston 10 to descend by gravity, while the upper end of the piston 10 is in some instances provided with a socket 12 for the reception of a detachable load engaging shoe, all in a well known manner.

With specific reference to Fig. 1, the improved weighing device illustrated therein, involves means in the form of an auxiliary cylinder 14 having an upwardly open liquid confining central bore 15 and a lower central projection 16 detachably cooperable with the jack piston socket 12; a load engaging plunger 17 having an O-ring 18 sealingly engaging the cylinder bore 15, and resting upon the liquid confined within the bore 15; and a load weight indicating gauge 19 connected by a detachable coupling 20 and a fitting 21 with the bore 15 beneath the plunger 17. In this embodiment of the invention, the weighing device is detachably secured to but carried directly by the upper end of the jack piston 10, and the weight indicating gauge 19, which is suspended from the cylinder 14 may be of standard construction having a pointer operable by fluid under pressure to visibly indicate the pressure applied to the liquid body confined within the bore 15 by the plunger 17 and its O-ring 18.

Referring especially to Fig. 2, the improved weighing device in this embodiment is similar to that shown in Fig. 1, but is formed as a unitary part of the jack by virtue of the fact that the auxiliary cylinder 14' is formed integral with the upper end of the jack piston 10. The plunger 17 with its O-ring seal, and the gauge 19 may also be the same as in Fig. 1, but the latter may be connected to the bore 15 by means of permanent fittings 23 omitting the detachable coupling 20. In both cases, however, it is desirable to mount the weighing device directly upon the piston 10 and to locate the pressure or weight indicating gauge 19 closely adjacent to the jack cylinder 6 and beneath the lower end of the liquid confining bore 15.

Since any side thrust exerted against the plunger 17 of the weighing device may detrimentally affect the accuracy of the gauge reading, it is desirable to provide some means for absorbing any off-center thrust. Several modifications of such means are shown in Figs. 3 to 6 inclusive, and as depicted in Figs. 3 and 4, the means comprises, a tubular guide 25 surrounding the jack cylinder 6, and having its upper end provided with a load engaging plate 26 recessed for cooperation with a sphere or ball 27 confined within a spherical zone recess 28 formed centrally within the top of the plunger 17', while the lower extremity of the tubular guide 25 carries a bearing ring member. In Fig. 3, this bearing member is in the form of a solid ring 29 embracing and slidably cooperating with the exterior of the jack cylinder 6; while in Fig. 4 the bearing member consists of an annular series of ball bearings 30 confined within threaded rings 31, 32 secured to the lower guide end and which rollably coact with the cylinder exterior. The tubular guide 25 is movable along the cylinder 6 with the piston 10, but there is only slight relative movement between the guide 25 and the cylinder 14.

In Fig. 5, the cylinder 14" of the hydraulic weighing device is provided with a second bore 15' disposed coaxially of and beneath its main bore 15, and the plunger 17" which coacts with the main bore 15 has a lower projection 34 slidably engaging the second bore 15'. The plunger 17" rests upon the liquid confined within the main bore 15 and is sealed by an O-ring 18, while the projection 34 is likewise sealed by an O-ring 18'; and the spaced coaxial peripheral surfaces of the plunger 17" and projection 34 will obviously absorb side thrust acting upon the plunger due to off-center loading and will thus maintain accuracy in the weight registration readings.

Since the accuracy of such reading may also be affected due to application of the load at an extreme inclination or angle relative to the jack axis as when the plunger of the weighing device is applied to the tapered axle housing of a truck or other vehicle, it is also desirable to provide for such continngency. In Figs. 6 and 7, the weighing device has its plunger 17' provided with a unitary spherical zone projection 27' at its upper end similar to the sphere 27 of Fig. 3, and a special load engaging member or block 36 has a semi-spherical inner socket 37 therein which rockably coacts with the projection 27'. The exterior of the block 36 is provided with a spherical zone surface 38 coacting with similar surfaces formed within a pair of upper and lower clamping rings 39, 40 respectively which are adapted to be clamped firmly against the block surface 38 with the aid of several screws 41 so as to cause the upper load engaging surface 42 of the block 36 to tilt as indicated in dot-and-dash lines so as to properly engage the adjacent axle housing or part of the load which is to be weighed. The lower ring 40 has a tubular guide 25 similar to that of Fig. 3 depending therefrom for absorbing side thrust on the block 36 after the latter has been clamped in angularly adjusted position by the rings 39, 40 and the screws 41, thus making this improved assemblage very flexible in use.

Since these weighing devices must frequently be applied beneath vehicles or the like at relatively inaccessible places, it is also desirable to have the jack or load elevator readily positionable without necessity of having the user crawl beneath the load. In Figs. 6 and 7, the jack has been provided with a carrying and positioning handle 44 secured to side bars 45 the lower ends of which are swingably attached to pivot pins 46 mounted in ears 47 connected to the base 9. These side bars 45 are flexible and adapted to be sprung into latching hooks 48 secured to the upper ring 39 by screws 49 in order to hold the handle erect for carrying purposes, but the side bars 45 may be deflected inwardly to clear the hooks 48 whereupon the handle 44 may be swung downwardly about the pivot pins 46 toward horizontal position as illustrated in Fig. 6 and utilized to position the jack beneath the load from a remote point and without requiring the user to assume the danger of getting beneath the vehicle.

When properly constructed as above described, the functioning of all of the devices is essentially the same except that the additional plunger guides of Figs. 3, 4, 5 and 6 insure more accurate results in cases where the plunger of the weight indicator is subjected to off-center loading or side thrust or due to other causes such as inclination of the load bearing surfaces. During normal use of the improved device, the hydraulic jack piston 10 may be raised to elevate the load by admitting liquid under pressure through the conduit 8, thereby bodily lifting the weighing device and causing the plunger 17, 17' or 17" to subject the liquid confined therebeneath within the bore 15 to pressure which is transmitted to the gauge 19 and accurately indicates the weight of the load. This load may be of a type adapted to be lifted bodily from its carrying vehicle, or it may be mounted upon the vehicle in a manner whereby the known weight of the latter must be subtracted from the total weight reading on the gauge 19 in order to determine the actual weight of the load alone. But in either case, the reading on this gauge 19 may obviously be thus utilized to accurately determine the weight of the load alone.

From the foregoing detailed description it will be apparent that the present invention in fact provides an exceedingly simple and compact device for accurately determining the weight of the load quickly and with utmost precision. The device is applicable either as a detachable unit or as an integral part directly to the load lifting members or pistons of various types of lifting jacks having such vertically movable members or pistons. But where hydraulic jacks are in particular involved, the aforesaid means insures far greater accuracy of readings than are obtainable by connecting the gauge 19 directly with the lower displacement chamber of a hydraulic jack piston 10 because of the friction induced by the coaction of the sealing ring 11 with the cylinder bore 7. The weighing assembly is simplified by mounting the auxiliary cylinder and plunger directly upon the load lifting member or piston 10 of the jack, and whenever the plunger of the weight indicator coacts with the load or is released there is only slight relative displacement of the plunger relative to its confining cylinder. It also is to be noted that this plunger 17 may be freely withdrawn from the bore 15 of the cylinder 14 for the insertion or removal of liquid.

In the embodiments of Figs. 1 and 3 the entire weighing device may be bodily applied to or removed from the jack at the will of the user, while in Fig. 2 the device is an integral part of the jack. The plunger guiding means shown in Figs. 3, 4, 5 and 6 insure maximum accuracy in weight readings, while the angularly adjustable load engaging block 36 of Figs. 6 and 7 enables the weight indicator to be most effectively applied to inclined surfaces of the loads. The handle 44 of Figs. 6 and 7 moreover enables the operator to safely apply the jack and weighing device to relatively inaccessible portions of the loads, and also provides simple means for carrying the assemblage from place to place. The improved weighing devices because of their compactness are readily transportable in an ordinary automobile, and have proven highly satisfactory and successful in actual use.

It should be understood that it is not desired to limit this invention to the exact details of construction or to the precise mode of operation of the weighing devices herein specifically shown and described, for various modifications within the scope of the appended claims may occur to persons skilled in the art.

We claim:

1. In combination with a jack having a main cylinder and a load moving piston reciprocable within the cylinder, an auxiliary cylinder carried by said piston and having a liquid confining bore, a load engaging plunger sealingly receiving said auxiliary cylinder bore and coacting with the confined liquid therein, a load weight indicating gauge carried directly by said auxiliary cylinder and being activated by pressure exerted upon said confined liquid by said plunger when sustaining a load, a tubular guide pivotally mounted directly upon said plunger and surrounding said main cylinder, and means for varying the fixed angularity of the load engaging portion of said plunger relative to the axis of said auxiliary cylinder.

2. In combination with a jack having a load moving member axially reciprocable within a supporting element, a cylinder carried by said member and having a liquid confining bore, a load receiving plunger sealingly coacting with said bore to confine the liquid therein, a load weight indicating gauge carried by said cylinder and being activated by pressure exerted upon said confined liquid by said plunger when sustaining a load, an elongated guide pivotally mounted upon said plunger and coacting with said element, and means for varying the fixed angularity of the load engaging portion of said plunger relative to the axis of reciprocation of said member.

3. In combination with a jack having a load moving member axially reciprocable within a supporting element, a cylinder carried by said member and having a liquid confining bore, a load receiving plunger sealingly coacting with said bore to confine the liquid therein, a load weight indicating gauge carried entirely by said cylinder laterally of said supporting element and communicating with said cylinder bore for activation by pressure exerted upon said confined liquid by said plunger when sustaining a load, an elongated guide mounted upon said plunger and coacting with said element, and means for varying the fixed angularity of the load engaging portion of said plunger relative to the axis of reciprocation of said member.

4. In combination with a jack having a load moving member axially reciprocable within a supporting element, a cylinder carried by said member and having a liquid confining bore, a load receiving plunger sealingly coacting with said bore to confine the liquid therein, a load weight indicating gauge carried by said cylinder and being activated by pressure exerted upon said confined liquid by said plunger when sustaining a load, an elongated guide mounted upon said plunger and coacting with said element, and means including a ball and socket joint for varying the fixed angularity of the load engaging portion of said plunger relative to the axis of reciprocation of said member.

References Cited in the file of this patent

UNITED STATES PATENTS

| | | |
|---|---|---|
| 1,920,285 | Wilkins et al. | Aug. 1, 1933 |
| 2,135,765 | Paine | Nov. 8, 1938 |
| 2,165,367 | Gormley et al. | July 11, 1939 |
| 2,373,469 | Grime | Apr. 10, 1945 |
| 2,392,702 | Saunders | Jan. 8, 1946 |
| 2,503,659 | Curtis | Apr. 11, 1950 |
| 2,674,851 | Wooley | Apr. 13, 1954 |

FOREIGN PATENTS

| | | |
|---|---|---|
| 755,412 | France | Sept. 4, 1933 |